Oct. 6, 1953
H. A. ROBINSON
2,654,832
HIGHLY SELECTIVE AND STABLE WIDE RANGE FREQUENCY CONVERTING CIRCUITS
Filed March 26, 1948
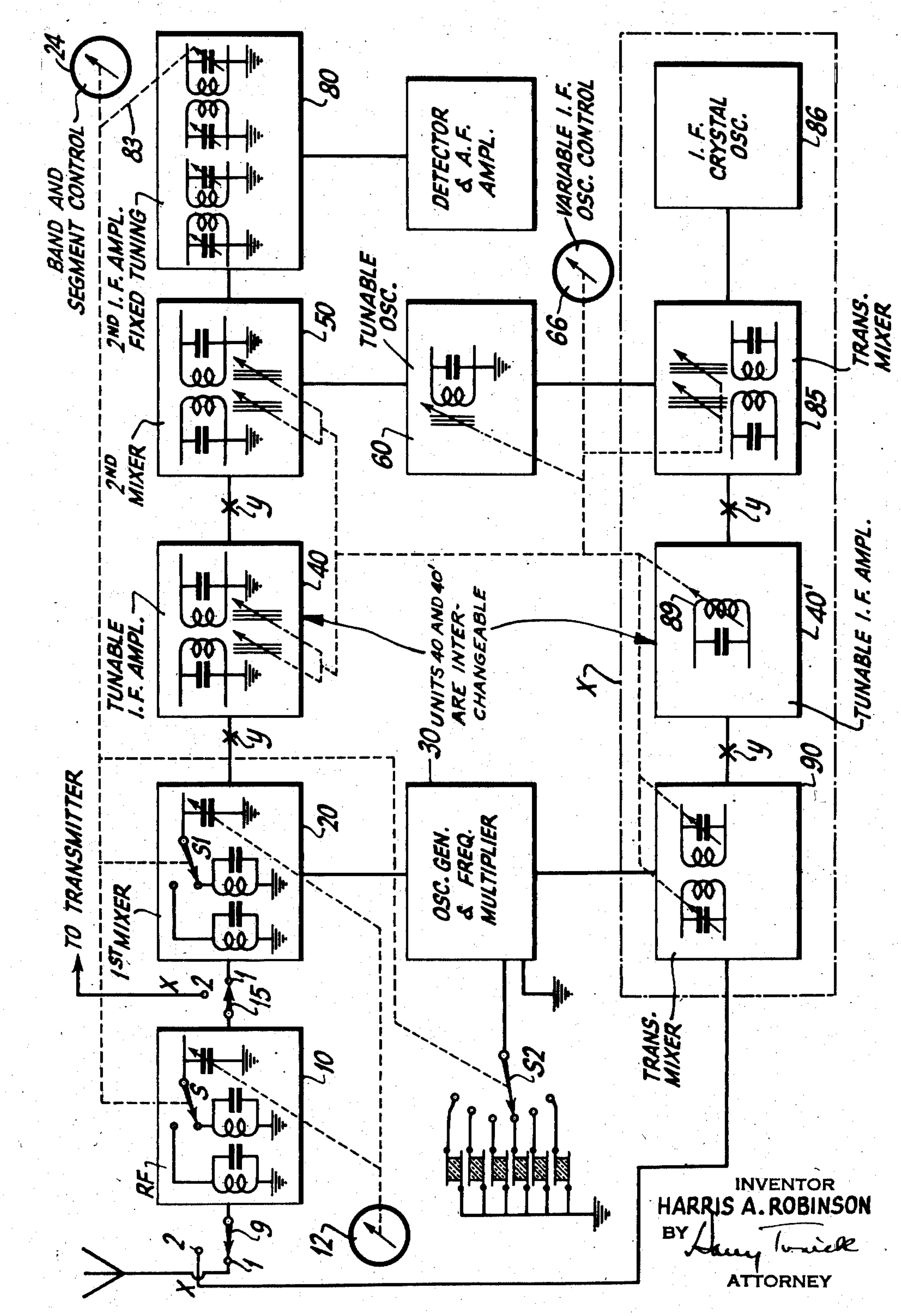
INVENTOR
HARRIS A. ROBINSON
BY Harry [signature]
ATTORNEY Patented Oct. 6, 1953

2,654,832

UNITED STATES PATENT OFFICE 2,654,832

HIGHLY SELECTIVE AND STABLE WIDE RANGE FREQUENCY CONVERTING CIRCUITS

Harris A. Robinson, Philadelphia, Pa., assignor to Radio Corporation of America, a corporation of Delaware Application March 26, 1948, Serial No. 17,254

4 Claims. (Cl. 250—13)

In this application, I disclose an improved method of and apparatus for receiving and generating oscillations of constant frequency the frequency of which may be changed continuously through a wide range of frequencies. As described, the generated currents are used in novel means for converting currents to lower frequency such as is done in heterodyne reception and for converting currents to higher frequency such as is done in transmitter exciters. My novel generating and frequency converting circuits may be put to other uses. To simplify the description, I have shown use thereof in a receiver and in a transmitter operating on the same frequency.

The general object of my invention is to provide simplified means for receiving and generating oscillatory energy of any one of a wide range of frequencies. A further object of my invention is to provide such receiving and generating means which are of a stability approaching that of a single frequency crystal controlled receiver or generator and to do so with a limited number of crystals. A further object of my invention is to provide a two-stage frequency converting circuit, such as used in a heterodyne receiver, stable in operation over an extremely wide and continuous frequency range, and to do so with a limited number of crystal elements in the heterodyne oscillators.

A feature of this application of my invention is that the second I. F. stages are of fixed tuning. The merits of such an arrangement in multiband equipment will be apparent to all.

A further object of my invention is to provide such apparatus which is flexible so that it may operate on any one of a multiplicity of frequency channels selected at any desired points in a wide frequency spectrum without the necessity of having specific crystals for each frequency which might be selected. By the use of my invention, operation with stability approaching that of direct crystal control is provided at any frequency in a range of two to twenty-five megacycles, by the use of a maximum of twelve crystals. When the apparatus is modified to excite a transmitter, one additional crystal in an oscillation generator is used. Although I have given above and in the description which follows, specific frequency ranges, my invention is not limited thereto since obviously the frequency range involved may be changed as desired to meet the needs at hand.

In its broadest aspect, my invention involves, when signal currents are to be converted (as in radio reception), a double heterodyne arrangement wherein the heterodyne oscillator is stabilized by a related group of crystals (or equivalent frequency stabilizing means). The crystals and harmonics thereof permit the heterodyne oscillator to excite the first mixer at any one of a series of fixed and relatively equally spaced frequencies. The first intermediate frequency amplifier and associated I. F. oscillator is variably tunable over a frequency range equal to or greater than one-half the frequency interval between the fixed frequencies selectable for the heterodyne oscillator. This first I. F. need only have the selectivity necessary for secondary image rejection. The second intermediate frequency amplifier in my converter then is fixed tuned and provides the desired selectivity. The advantage of such a system will at once be apparent to those skilled in the art. In all cases, the arrangement is simplified and provides improved performance since obviously it is easier to arrange circuits of fixed tuning to obtain the desired selectivity than it is to do so when the I. F. amplifier circuits are variable. This feature is of great importance in applications such as disclosed herein wherein the signal currents to be converted may fall at any point in an extremely wide band of frequencies such as from two to twenty-five megacycles. To secure a fixed frequency I. F. in the second I. F stages, I provide as the second oscillator one that is tunable over a range of frequencies equal to the range of frequencies over which the first I. F. amplifier is variable. To provide the wide coverage mentioned above, the first oscillator is of fixed frequency, the frequency of which may be changed by intervals of about equal width through the wide range of frequencies mentioned above. The frequency intervals are separated by the order of the tuning range of the variable I. F. amplifier and associated tunable I. F. oscillator (or twice this tuning range as described in an alternate arrangement).

When the currents converted are to be used to excite a transmitter, a crystal oscillator of a fixed frequency equal to the frequency of the second I. F. supplies oscillations for mixing with the oscillations from the tunable oscillator and the output frequency (either sum or difference as desired) is selected for further mixing with oscillations from the wide range crystal oscillator described above. This mixing takes place in a second transmitter mixer which supplies the side band currents (upper or lower as desired) to excite the transmitter. The first oscillator of fixed frequency, the frequency of which may be changed in steps may comprise a crystal controlled generator and multipliers which supply harmonics so that the number of frequencies obtainable is much greater than the number of crystals required to stabilize the oscillations.

While it is thought that my invention and the advantages gained by the use thereof will be apparent to those skilled in the art, I have described the same in detail hereinafter. In this description, reference will be made to the single figure in the drawings. This figure shows schematically and partly by rectangle, the essential features of wide band stable oscillation generating and frequency converting apparatus arranged in accordance with my invention.

In the drawings, 10 is a radio frequency amplifier comprising amplifier tubes and selective circuits interconnecting the same. The circuits are tunable and arranged to operate at a plurality of bands with band switching means including switch S and tuning means including control 12. The tuning means may be automatic or manual. The radio receiver is to operate on a multiplicity of channel frequencies and the total range may, as stated above, extend from two to twenty-five megacycles so that the channel switching and tuning in 10 is appropriate to cover this range.

The radio frequency unit 10 supplies output to a first mixer 20. The mixer 20 is arranged for similar band changing and tuning and the band switching and tuning may be controlled by the same means controlling the band switching and tuning in unit 10. This is indicated by connecting switch S1 to the common control means including band and segment control 24. The first mixer 20 is also coupled to an oscillation generator and frequency multiplier 30 which feeds oscillatory energy into 20 for heterodyne conversion. The oscillation generator 30 comprises a plurality of crystals which may be switched into circuit by switch S2 to operate the oscillator at different frequencies. The switch S2 may be mechanically coupled to the switches S and S1 although in general it has many more positions. In the embodiment described, 12 crystals are used at the oscillator 30 to cover the range of two to twenty-five megacycles. The crystal control oscillations are harmonically multiplied in frequency to extend the coverage. This oscillator and multiplier in one embodiment are arranged to supply output in one megacycle steps under control of the band and segment control switch 24.

The first mixer 20 supplies output to a tunable I. F. amplifier 40. This I. F. amplifier in one embodiment is tunable over a range substantially equal to the frequency difference between any two adjacent (fundamental or harmonic) frequencies supplied to mixer 20 by generator 30. In another embodiment, it is tunable over a range equal to half the frequency difference between any two adjacent (fundamental or harmonic) frequencies supplied by the generator and frequency multiplier 30 to the mixer 20. In the embodiment now being described, the frequency separation between any two adjacent harmonics or fundamentals supplied by oscillator 30 to mixer 20 is assumed to be one megacycle, in which case the intermediate frequency amplifier 40 is tunable over a range of one megacycle. The range in the embodiment now being described extends from 1,000 to 2,000 kc. The intermediate frequency amplifier 40 supplies output to a second mixer 50 tunable over a similar range. The second mixer 50 is also supplied with oscillations from a stabilized tunable oscillator 60, the tuning of which is likewise variable over an equivalent frequency range. Permeability tuning may be used in the I. F. amplifier 40, second mixer 50 and second tunable oscillator 60, or tuning may be accomplished in one or all of these units by variable capacitors. A common control means 66 is used to tune the I. F. amplifier 40, the second mixer 50 and tunable oscillator 60.

In the embodiment being described, the variable oscillator 60 is tunable in a range extending from 1,400 to 2,400 kc. The first I. F. stage including the second mixer 50 includes only sufficient selectivity in the way of tuned circuits to assure secondary image rejection and to supply to the second intermediate amplifier 80 the desired side band. The second intermediate frequency amplifier 80 is fixedly tuned, and the high degree of selectivity necessary to separate adjacent channels is included in this amplifier 80. A primary object of my invention is to eliminate the need of a large number of stages of high selectivity in the variably tuned intermediate frequency amplifier and this object is attained in accordance with my invention by the use of the tunable oscillator 60 and tunable I. F. amplifier 40 of limited selectivity heterodyning to a relatively low fixedly tuned I. F. amplifier 80. The fixed I. F. amplifier at 80 may be made highly selective and may comprise a plurality of tuned circuits with selectivity control means, indicated at 83, operated by the band and segment control dial 24. For example, the selectivity can be greater for lower frequencies, say of the order of five megacycles and broadened out for higher frequencies, such as, for example, when the signal being received is of the order of twenty-two megacycles. The second highly selective intermediate frequency amplifier at 80 in the embodiment being described is operated at 400 kc.

In operation, assume that the radio frequency carrier being received at 10 is to be at 17.250 megacycles. By means of the band and segment control dial 24, band switching takes place in 10 to include the frequency segment 17 to 18 mc. The same band and segment control member 24 also operates S2 to select in the oscillation generator and frequency multiplier 30, a crystal operating at such a fundamental that the harmonic supplied from 30 to the first mixer is at 19 mc. Since we are going to adjust the apparatus for conversion of a radio signal of 17.250 megacycles, the calibrated tuning control apparatus 66 is adjusted to set up in the oscillator 60 oscillations of a frequency such that when the difference frequency from the first mixer is selected it will be further heterodyned to the fixed second I. F. of 400 kc. As an example, the oscillator in 60 might be set to operate at 2150 kc. In the example given, then, the same adjustment operates through a common control to tune the intermediate frequency amplifier 40 and second mixer input to 1,750 kc. Then the R. F. stage 10 is peaked, that is, brought into exact resonance at the frequency of the incoming wave at 17.250 megacycles by adjustment of the dial 12 manually or automatically. Since the oscillator 60 is variable from 1,400 kc. to 2,400 kc. (now set at 2,150 kc.) it will be apparent that without further adjustment of the crystal controlled oscillator at 30 the R. F. at unit 10 may be selected anywhere in the 17 to 18 mc. frequency segment.

In a second embodiment giving greater band spread and improved overall stability, the tunable I. F. amplifier 40, mixer 50 and tunable oscillator 60 are tuned over a 500 kc. range (half the crystal frequency intervals) instead of a 1,000 kc. range as described above. Complete frequency coverage from 2 to 25 megacycles is obtained with a total of 46 frequency segments of 500 kc. each by in effect adding the 500 kc. I. F. tuning range to, or subtracting it from, the multiple or fundamental output from the crystal generator at 30 at the one megacycle intervals and by having the oscillatory energy from the unit 30 above or below the frequency of the desired R. F. signal from the unit 10.

In operation, assume that the radio frequency carrier being received at 10 is to be 14.150 megacycles. By means of the band and segment control dial 24, band switching takes place in 10 to include the frequency segment 14 to 14.5 megacycles. The same band and segment control member 24 also operates S2 to select in the oscillation generator and multiplier 30, a crystal operating at such a fundamental that the harmonic supplied from 30 to the first mixer is at 13 megacycles. Since we are going to adjust the apparatus for conversion of a radio signal of 14.150 megacycles, the calibrated tuning control apparatus 66 is adjusted to set up in the oscillator 60 oscillations of a frequency such that when the difference frequency from the first mixer is selected, it will be further heterodyned to a fixed second I. F. of, say 300 kc. in this example. Thus, the oscillator in 60 might be set to operate at 850 kc. In the example given, this same adjustment operates through a common control to tune the first intermediate frequency amplifier 40 and second mixer input to 1150 kc. Then the R. F. stage 10 is peaked, that is, brought into exact resonance at the frequency of the incoming signal at 14.150 megacycles. In this embodiment, the oscillator 60 is variable from 700 to 1200 kc. (now set at 850 kc.) and the tunable first I. F. amplifier tunes over the frequency range 1000 to 1500 kc. (now set at 1150 kc.). It will be apparent that without further adjustment of the crystal controlled oscillator at 30 the R. F. signals at unit 10 may be selected anywhere in the 14 to 14.5 megacycle frequency segment by merely adjusting the tuning control 66, tuning the first I. F. amplifier and associated oscillator. The tuning segment from 14.5 to 15 megacycles is obtained by setting the band and segment control 24 to the next higher segment which selects a frequency of 16 megacycles from the oscillation generator 30. Thus, by tuning the first I. F. amplifier over the range from 1500 to 1000 kc. the corresponding signal input frequency of 14.5 to 15 megacycles is available for the R. F. amplifier 10. For example, a frequency of 14.625 kc. would be correctly tuned by setting the control 66 and tuning the first I. F. amplifier to 1375 kc. In this example, where the tunable oscillator is on the low frequency side of the first I. F. amplifier, separated by the 300 kc. second I. F., I would have at this setting the oscillator frequency of 1075 kc.

When it is desired to operate the system as a transmitter, then additional elements designated X are supplied. The elements comprise a transmitter mixer 85 coupled with an I. F. crystal oscillator 86 operating at the second I. F. of the receiver. Now, when the variable output from oscillator 60 is mixed with output from the crystal oscillator at 86, the output of mixer 85 is I. F. energy falling in a band corresponding to the band used in the tunable I. F. amplifier 40. This I. F. amplifier is represented by rectangle 40′ and is tunable as represented at 89 through a similar range, and the control for this tuning means may be common with the control for the tunable oscillator 60, tunable mixer 50 and tunable I. F. amplifier 40. In a typical application, the tunable I. F. amplifier 40 is switched to perform the function represented at 89 during transmission. Then switching means represented at points Y is operated to disconnect the unit 40 from the units 20 and 50 and to connect the unit 40 at 40′ between units 85 and 90. A second transmitter mixer 90 has its input coupled to this tunable amplifier 40′ and to the crystal oscillation generator 30. Thus, at the output of the mixer 90, I have oscillatory energy, the frequency of which may be selected through a frequency range corresponding to the wide range through which the oscillator 30 is employed when used for receiver conversion, as previously described. Switch 9 in #2 position supplies this energy to the stage 10 for amplification in the selective R. F. amplifier 10. This amplified carrier may be fed by switch 15 in #2 position to excite the output stages of the transmitter. The transmitter and receiver are thus adjusted for simplex operation on the same frequency.

In previous apparatus of this type using a simple mixing action and arranged to operate over a corresponding frequency range, I. F. band switching and tuning is used and to get the necessary selectivity, a large number of tuned circuits are used for each I. F. amplifier. In my system, the first I. F. amplifier stages only are variable and have only sufficient selectivity to reject spurious responses. I have found that a total of four circuits in the stages 40 and 50 broadly tuned to the output of mixer 20 operate satisfactorily. Then the necessary selectivity is built into the fixed I. F. stages of units 50 and 80 which are tuned to the output of mixer 50. The choice of the second I. F., in the example given, 400 kc., takes into consideration spurious responses which may appear at the second converter. In a similar manner, selection of the fundamental and harmonics used at 30 depends to a considerable degree on the spurious frequencies which may appear at the first converter 20.

An advantage that results from use of my system is that the tunable oscillator may have a calibrated fine tuning scale at 66, with band spread effects, reading the same kc. coverage (1000 kc. or 500 kc. in the examples given) throughout the entire frequency spectrum of 2 to 25 mc. when the crystal oscillator 30 outputs are spaced 1 megacycle as in the example given. Thus, in effect, the band covered (2 to 25 mc.) is effectively separated into 23 equal segments or bands of 1000 kc. in the first example given and 46 equal segments or bands of 500 kc. in the second example given. Thus, a high degree of electrical band spread and accurate dial calibration is provided.

My system provides frequency stability approaching that of a directly controlled crystal oscillator over the entire frequency band. The frequency stability increases, on a percentage basis, at the higher signal frequencies, permitting a higher degree of receiver selectivity. The number of R. F. bands is small as compared to the range covered. In the example given, five bands only are required. Permeability or capacitor tuning of the R. F. amplifier 10 may be used.

What is claimed is:

1. In a frequency converting circuit arrangement adaptable for a radio receiver or transmitter, a double superheterodyne receiver and associated transmitter comprising a high frequency crystal oscillator, a plurality of crystals arranged for selective connection to said oscillator to cause the same to operate at a selected frequency, each crystal frequency determining a particular segment of the over-all frequency spectrum in which a desired frequency channel is located, a first mixer coupled to said oscillator, a tunable I. F. amplifier coupled to said mixer, said amplifier being tunable through the frequency interval separating adjacent crystal frequencies, a second mixer coupled to said amplifier to receive a first I. F. therefrom, a tunable oscillator coupled to said second mixer, the frequency of said tunable oscillator being selected to produce, by heterodyne action with the first I. F., a second I. F. mixer output of essentially fixed frequency, and a selective fixed tuned second I. F. amplifier coupled to said second mixer, with additional means for transmission, including means for converting in a first transmitter mixer the output of the said tunable oscillator and the output of a crystal oscillator which generates a frequency equal to the second I. F., a tunable amplifier which selects a frequency component equal to the first I. F., a second transmitter mixer for combining this first I. F. component with the selected high frequency crystal oscillator output, said second mixer having therein means for providing a desired signal side band in the output of this mixer.

2. Apparatus as recited in claim 1 wherein the tuning of the tunable I. F. amplifier, tunable oscillator and tunable amplifier for transmission are mechanically controlled by a single control.

3. Apparatus as recited in claim 2 wherein the control selecting the high frequency oscillator crystal together with the tunable I. F. amplifier-oscillator control provide means for precise calibration and selection of the desired frequency for reception and transmission, the former functioning as a frequency segment selection control and the latter as a vernier or fine tuning control, providing electrical band spread.

4. Apparatus as recited in claim 1 wherein the circuit elements employed for the tunable I. F. amplifier during reception are switched during transmission to function as the tunable amplifier coupling the two transmitter mixers.

HARRIS A. ROBINSON.

References Cited in the file of this patent

UNITED STATES PATENTS

| Number | Name | Date |
|---|---|---|
| 2,206,181 | Gilbert | July 2, 1940 |
| 2,282,092 | Roberts | May 5, 1942 |
| 2,317,547 | McRae | Apr. 27, 1943 |
| 2,323,924 | Mayer | July 13, 1943 |
| 2,408,826 | Vogel | Oct. 8, 1946 |
| 2,419,593 | Robinson | Apr. 29, 1947 |
| 2,447,392 | Byrne | Aug. 17, 1948 |
| 2,451,291 | Koch | Oct. 12, 1948 |
| 2,487,857 | Davis | Nov. 15, 1949 |

FOREIGN PATENTS

| Number | Country | Date |
|---|---|---|
| 687,771 | France | May 5, 1930 |